(12) United States Patent
Carpenter et al.

(10) Patent No.: US 8,209,469 B2
(45) Date of Patent: Jun. 26, 2012

(54) OFFLINE DEVICE-SIDE LOGICAL UNIT NUMBER CONTROLLER

(75) Inventors: Todd L. Carpenter, Monroe, WA (US);
David Abzarian, Kirkland, WA (US);
Mark Myers, Fall City, WA (US); David J. Steeves, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 12/400,801

(22) Filed: Mar. 10, 2009

(65) Prior Publication Data

US 2010/0235596 A1    Sep. 16, 2010

(51) Int. Cl.
*G06F 12/00* (2006.01)
(52) U.S. Cl. ...................................... 711/103
(58) Field of Classification Search .................. None
See application file for complete search history.

(56) References Cited

U.S. PATENT DOCUMENTS

| | | | |
|---|---|---|---|
| 6,845,387 B1 | 1/2005 | Prestas et al. | |
| 7,055,014 B1 | 5/2006 | Pawlowski et al. | |
| 7,194,538 B1 | 3/2007 | Rabe et al. | |
| 7,237,046 B2 | 6/2007 | Paley et al. | |
| 7,334,096 B1 | 2/2008 | Burriss et al. | |
| 2008/0052461 A1* | 2/2008 | Kavian | 711/115 |
| 2008/0270564 A1 | 10/2008 | Rangegowda et al. | |
| 2009/0228823 A1* | 9/2009 | Edwards et al. | 715/772 |
| 2010/0185825 A1* | 7/2010 | Abzarian et al. | 711/163 |

OTHER PUBLICATIONS

King Bill,"LUN Masking in a SAN", Retrieved at<<http://www.hc.kz/pdf/lun_masking.pdf>>, Jul. 1, 2001, pp. 1-12.
"Using Raw Device Mapping", "VMWARE", Retrieved at<<http://www.vmware.com/pdf/esx25_rawdevicemapping.pdf>>, pp. 1-16.

* cited by examiner

*Primary Examiner* — Brian Peugh
(74) *Attorney, Agent, or Firm* — Gonzalez Saggio & Harlan LLP

(57) ABSTRACT

Described is a technology by which a single physical storage device such as a USB flash memory device is able to boot different computing devices via corresponding different operating systems. The storage device includes a selection mechanism that determines which virtual disk (corresponding to a LUN) is seen by the host as the currently active LUN having sector 0, and therefore is the boot disk. The selection mechanism also may select which (if any) other LUNs are visible to the host. The selection mechanism and accompanying indicator may be operated when the storage device is disconnected, e.g., via manual switches and/or LEDs, buttons and/or a display (e.g., via internal power). Also described is allowing each LUN to have a user-friendly name.

20 Claims, 8 Drawing Sheets

OFFLINE DEVICE-SIDE LOGICAL UNIT NUMBER CONTROLLER

BACKGROUND

Data storage capacity has grown to a point where it is now feasible to carry personal data, an operating system and applications on a single portable storage device such as a portable hard disk drive or USB flash drive device. It is possible to boot a computer system or another device to run with an operating system that is stored on such a storage device.

Most host computing devices and other devices have a BIOS or firmware that is architected such that the BIOS or firmware inspects the first sector of a disk to bootstrap the operating system. However, a disk can only have one instance of a first sector. As a result, booting multiple operating systems from a single physical disk requires a boot manager that resides in the first sector of the disk, and then continues the boot process based on user selection; this works with some personal computers, but not all, and typically not with other bootable devices. Boot managers are architecture-specific or host-specific, and thus a single physical disk cannot be used for booting devices of differing architectures, such as a game console, a PowerPC host and an x86 PC.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a single physical storage device (such as a USB flash memory device) is able to boot different computing devices, via corresponding different operating systems, by appearing to each booted device to be an appropriate disk for that particular device, e.g., with a single sector 0. A storage device is configured with multiple virtual disks corresponding to LUNs (logical unit numbers representing separate units of storage). A LUN controller controls access to the LUNs by the host computing device, including presenting only a single active LUN (having sector 0) to the host. A selection mechanism is coupled to the LUN controller to allow users to set which LUN is the currently active LUN.

In one aspect, for host computers that cannot deal with multiple LUNs, or for various other reasons (e.g., privacy and security), the selection mechanism is also used to configure which (if any) other LUNs that are not the currently active LUN are to be visible to the host computer. An indicator that operates independent of whether the storage device is connected to the host computer or not may be used to show which LUN is currently active and/or the visible or invisible state of each other LUN.

In one aspect, the selector mechanism and/or indicator are operable independent of whether the storage device is connected to or disconnected from any external device. For example, one or more manual switches may be used to make the selections. Alternatively, LEDs, buttons and/or a display may be used as the selector/indicator when internal or external power is available.

In one aspect, each LUN may be named by a user, e.g., given a user-friendly name. The name may be displayed on a display screen, for example, to help the user in making a selection. Menus may be provided, such as to select a LUN, and then set the properties (including renaming) each LUN.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
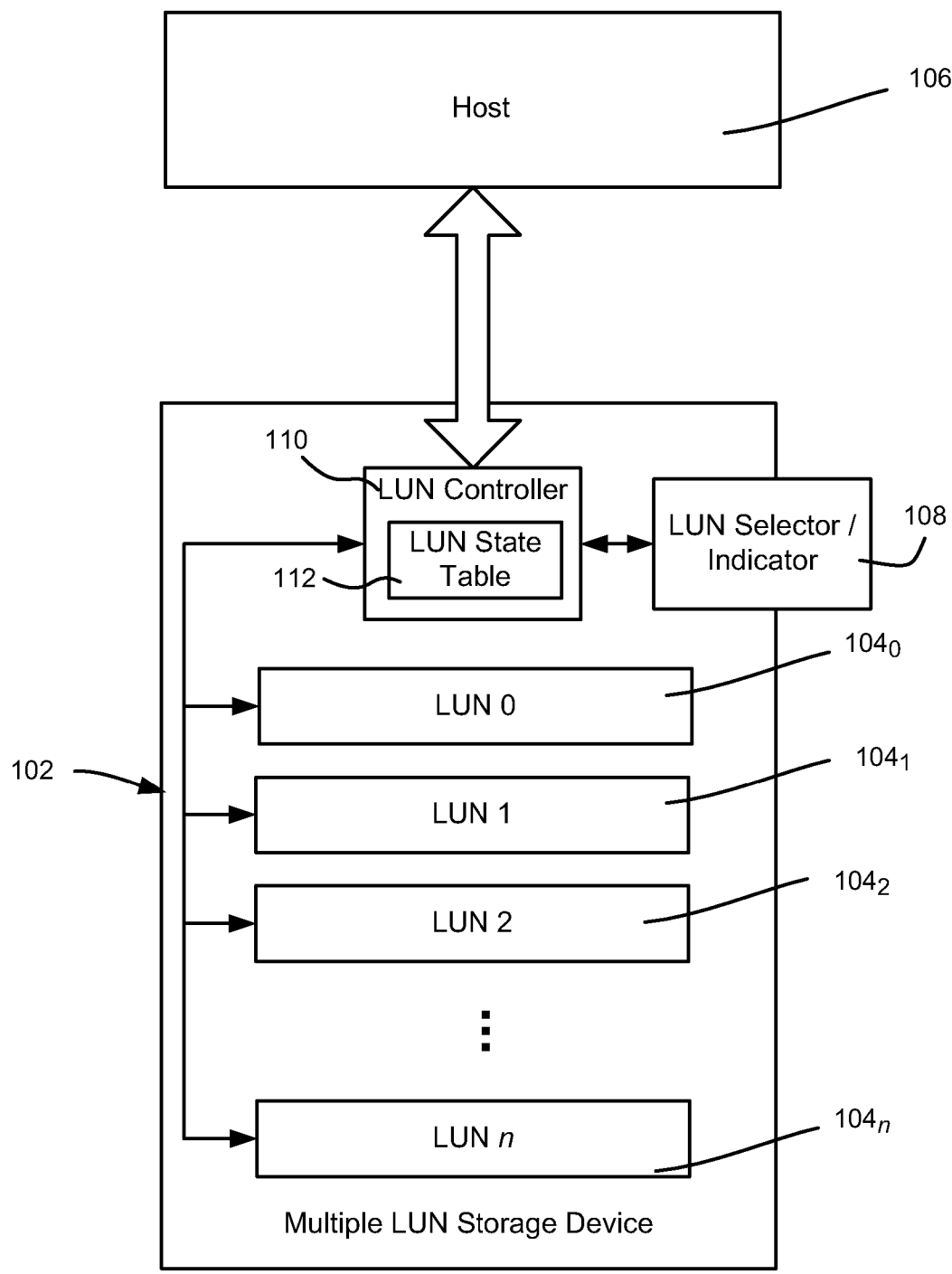
FIG. 1 is a block diagram showing an example storage device configured with multiple, selectable LUNs.

Various aspects of the technology described herein are generally directed towards allowing a user to select an active disk from a set of virtual or logical disks created on a storage device, thereby allowing a single storage device to boot one of various hosts and devices. The selection may be offline, without connectivity to a host. Note that as used herein, the term "disk" refers to any storage medium or combination of storage media (including flash memory devices, hard disks, tape and so forth), regardless if physically comprising a disk, and thus includes a USB storage device. Further, as the aspects described herein are agnostic of the physical layer, any bus types may be used, e.g., IEEE 1394, USB, IDE, EIDE, SATA, Fiber, and so forth; note however that LUNs are a SCSI protocol concept, and thus similar protocol concepts may be implemented as appropriate, and are considered equivalent.

To select among disks for booting, each of the virtual or logical disks is expressed as a LUN (a logical unit number, a well-known concept in data storage), which is statically defined or dynamically created from a set of logical blocks from the physical disk. Further, a mechanism is provided to offline select (prior to attaching to any given host) an active disk from among a set of virtual, logical and/or physical disks. In another aspect, also described is a mechanism to select which of the remaining LUNs are visible to the host upon connection, e.g., because some hosts are unable to correctly handle multiple LUNs, or because the user may not wish the host to have physical access to specific LUNs due to security or privacy concerns. Note that a host has access to each visible LUN, although it is feasible to have different types of access allowed, e.g., read-only; visible but with its contents protected from unauthorized access; and so forth. Further, invisible LUNs may have different types of access control enforced, e.g., invisible may correspond to read only, not readable, readable/not-writeable, no read or writes, and so forth.

While the examples herein show a transient storage device in the form of a USB drive configured to provide selection, it should be understood that this is only one example of a disk, and that any examples described herein are non-limiting examples. Further, offline the selection mechanisms described herein are only examples, and offline selection may be made via any mechanism, including one that is separate from the storage device (e.g., a trusted laptop computer that is not the host to be booted with the device). Another example is an internal storage device that provides one or more connections for an external LUN selector and/or one or more interfaces that allow LUN selection, e.g., prior to boot or initialization.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage in general.

FIG. 1 illustrates a multi-LUN storage device 102 with some number (n) of LUNs $104_0$-$104n$, each with its own sector 0. Note that dividing a storage device into such LUNs is known. Further, multiple physical disks with independent LUNs are indistinguishable to the host, and thus are equivalent to a multiple-LUN device. As described herein, without connection to a live host 106, that is, offline, one of these LUNs (e.g., $104_2$) is able to be user-selected (via mechanism 108) as active LUN 0, which is the LUN that is used to boot the host 106. As also described herein, the user has the ability to offline select which other LUN or LUNs, if any, are visible to the host 106 when connected. A LUN controller 110 (e.g., built into the device storage controller) maintains data about the state of each LUN in a table 112 (or other suitable data structure), and handles the logical coupling of the active JUN and any visible LUNs to the host; any remaining LUNs that are set as visible to the host may be virtually numbered for use when connected, e.g., starting from one and ordered according to their actual LUN number. The user may also see the state of the LUNs (as maintained in the table 112) via the selector/indicator mechanism 108.

Figure 2:
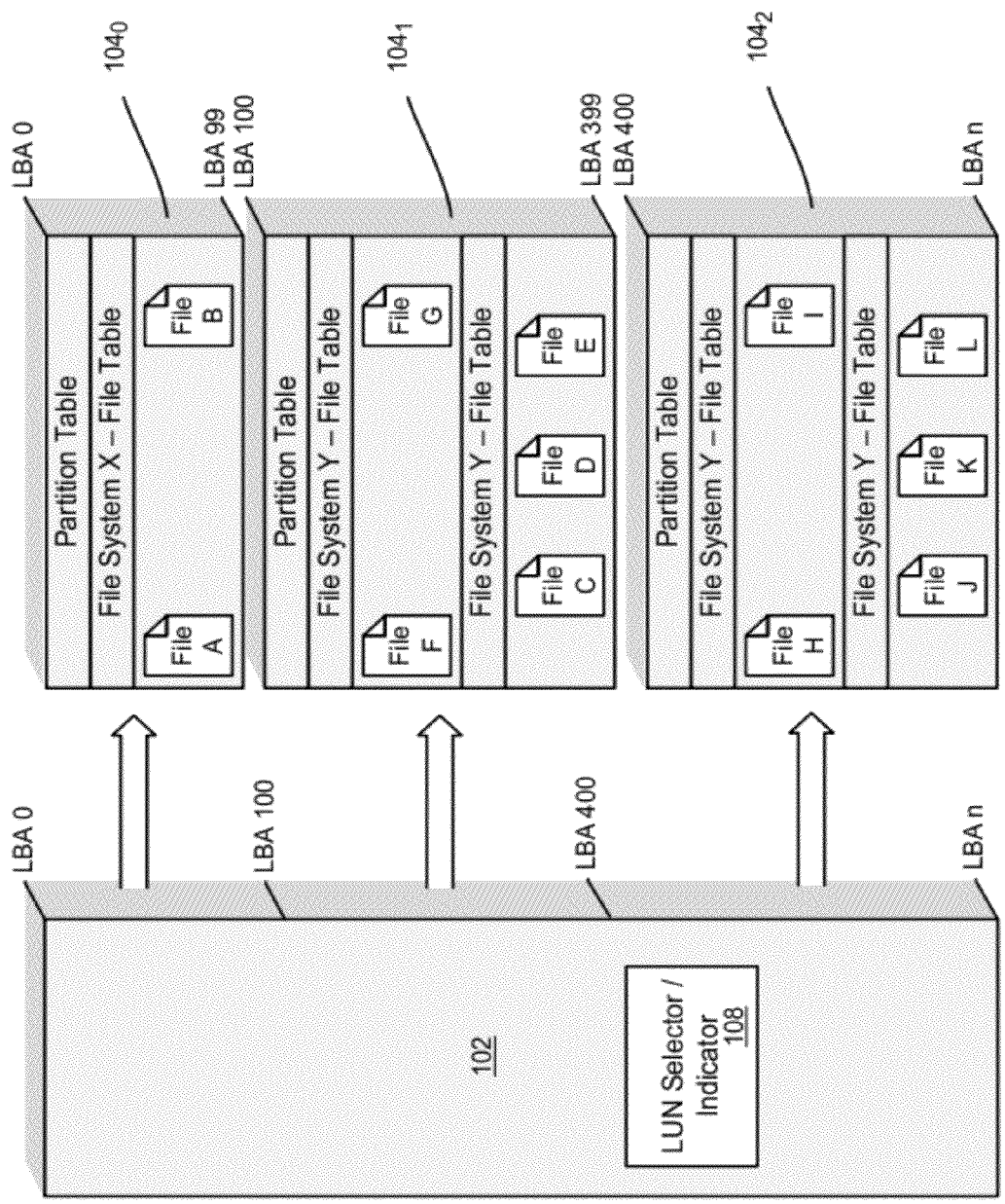
FIG. 2 is a block diagram showing partitioning of LUNs.

The LUNs $104_0$-$104n$ may be further partitioned as illustrated in the example of FIG. 2. In FIG. 2, a LUN with a single partition such as the LUN $104_0$ maybe formatted with any version of a file system, such as FAT, NTFS, UDF, ISO9660 and so forth. Note that by formatting multiple LUNs, such as with a file system typically used for optical media, LUN selection may function as a manual 'virtual' disc changer. Contemporary storage devices may hold the equivalent data of hundreds of compact discs, and for example may be copied as one CD to one LUN, allowing isolation as desired by the owner. By way of one usage example, a computer consultant may carry such a multiple-LUN device around as a toolkit, such as to troubleshoot computers of various operating systems.

In another aspect, network connectivity is provided by including any needed network drivers (for any wired or wireless network, including LAN, WLAN, infrared, Bluetooth®, and so forth) on the LUN that is the active LUN 0, (or another visible LUN). Different driver sets for different network cards may be maintained so that an appropriate set is available; note that driver sets as well as other files may be shared, e.g., two different operating systems each on its own LUN may access drivers maintained on another LUN (or the other's LUN). Note that a LUN may also be configured to boot a host device using a network boot.

The following table shows one example of an offline LUN control configuration maintained by the device, including the LUN number (a suitable identifier), a friendly name (e.g., useful with menus as described below), data indicating which LUN is currently active, and data indicating whether each LUN will be visible to a host when connected. This table is used to construct the LUN information output by the device in some way (as described below with reference to FIGS. 3-7):

| LUN | Friendly Name | Active LUN 0 | Visible |
|-----|---------------|--------------|---------|
| 0 | Windows | | No |
| 1 | IP Phone | | No |
| 2 | Xbox 360 | ✓ | Yes |

Note that there is only one Active LUN 0, and therefore there is only one row in the table with Active LUN 0 set. Any LUN set as Active LUN 0 is automatically visible and its visible property is not configurable.

The mechanism for selecting the active LUN 0 may be implemented in many ways, including via a separable device that is configured to power the multiple-LUN device and provide an interface for controlling the multiple-LUN device. However, there are benefits to providing a multiple-LUN device configured for standalone LUN selection, that is, one that facilitates LUN selection without needing any connection to an external device.

Figure 3:
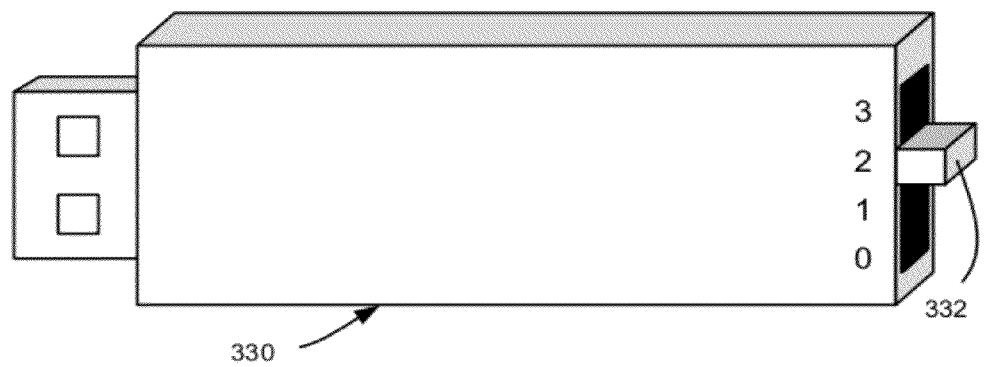
FIGS. 3-6 are representations of multiple LUN devices each with LUN selection/indication capabilities.
Figure 4:
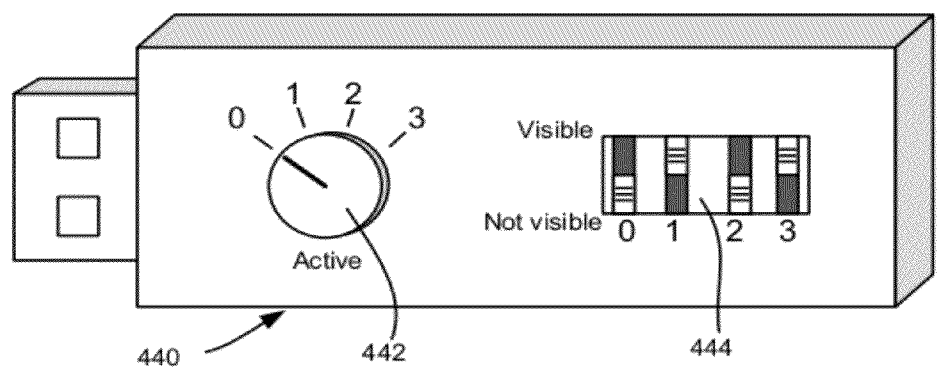

FIGS. 3-6 provide examples of standalone multiple-LUN devices that include a LUN selection mechanism. For example, FIG. 3 shows a device 330 with a physical multi-position switch 332 used for LUN selection; FIG. 4 shows a device 440 with alternative switch mechanism 442. With respect to making the non-selected LUNs visible or invisible to the host when coupled, it can be readily appreciated that an additional switch may be present, or such logic may be coded into the device, such as when the operating systems, applications and data are written to the device. A DIP switch 444 is another alternative for providing visibility selection, (and may similarly be used with the implementation of FIG. 3); note that the currently active LUN is visible, and thus a switch setting set to "Not Visible" when a LUN is active is ignored by the control logic.

Figure 5:
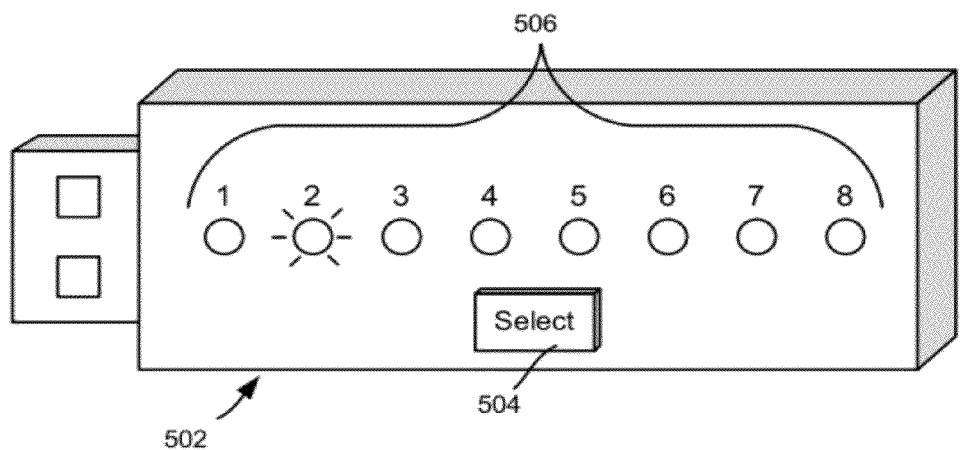
Figure 6:
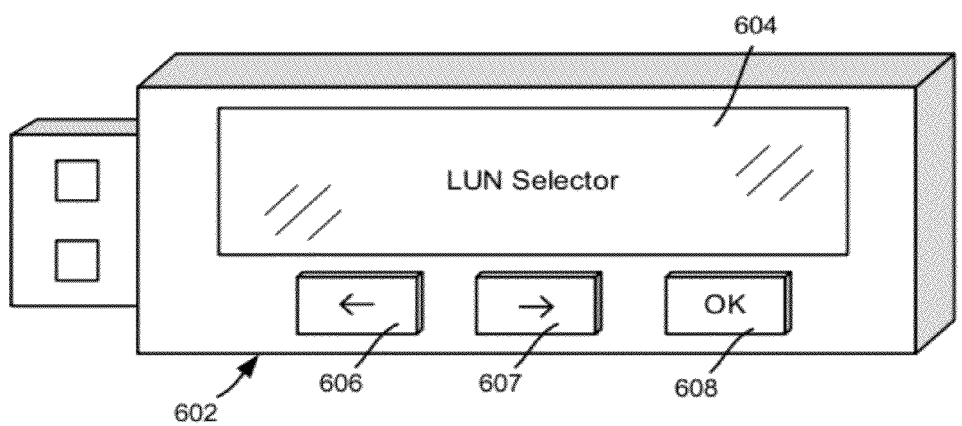

FIGS. 5 and 6 are still further examples of multiple-LUN devices 502 and 602 respectively that include a LUN selection/indication mechanism. Note that some type of power, such as an internal battery, capacitor, inductor, solar panel and/or the like are present for standalone selection with the implementations of FIGS. 5 and 6.

FIG. 5 shows an implementation having a selection button 504 for switching among LUNs, with multiple indicators 506 (e.g., LEDs) that show which device is the selected LUN. Note that the same indicators 506 may be used to indicate visibility (e.g., green means active and visible, yellow visible/not the active LUN, and red invisible/not the active LUN), or a second set of indicators may be provided. A different button may be used for visibility selection, or the same button 504 may be used, e.g., press once to illuminate the indicators, press twice rapidly to enter an active LUN switching mode that steps through the LUNs via additional presses, or press and hold to enter a visibility switching mode that steps through the LUNs via additional presses. A very long press and/or a timer may be used to end the indicator illumination to save power and also to exit the current mode.

Figure 7:
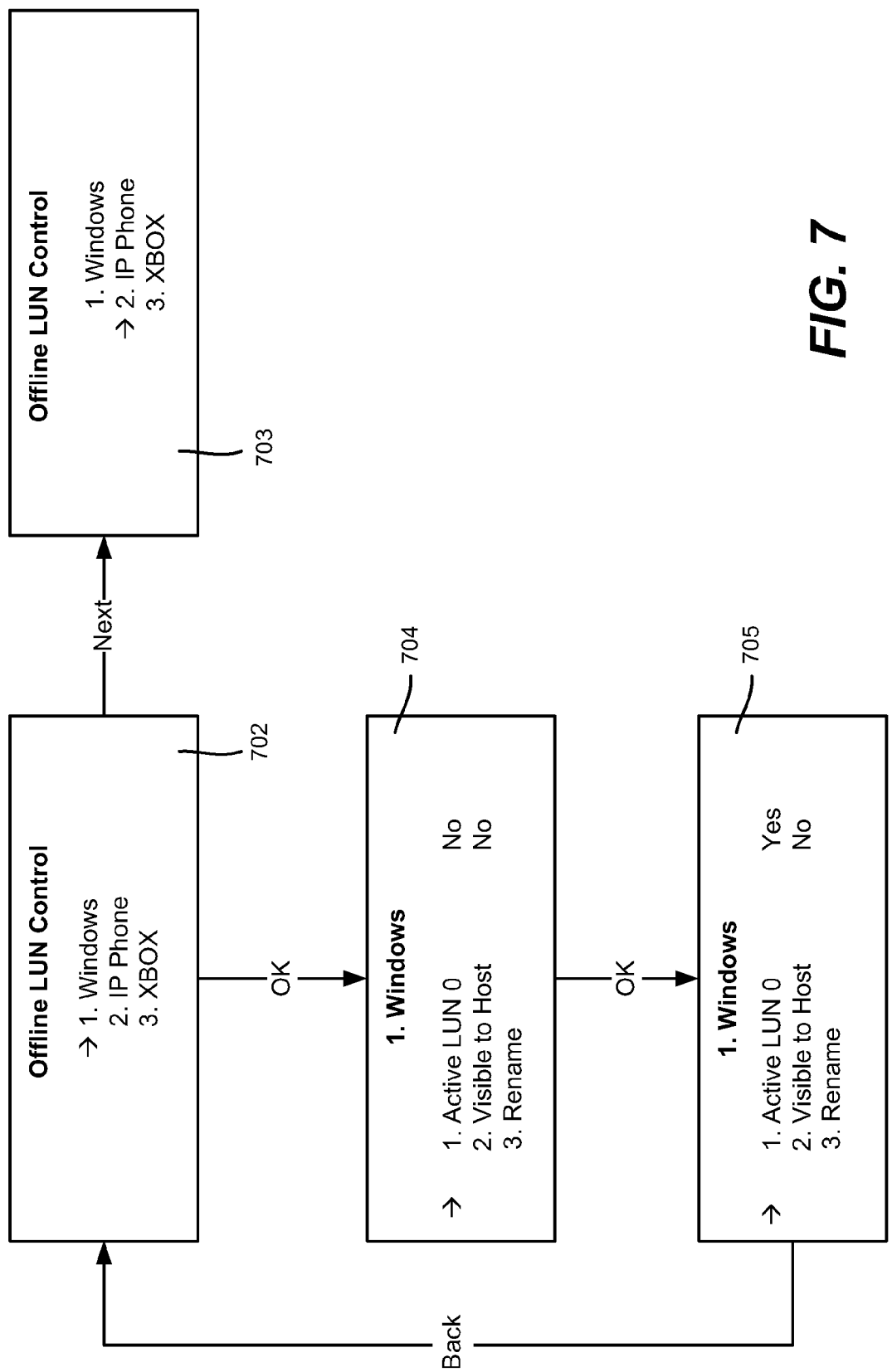
FIG. 7 is a representation of a menu-driven system that may be used for interacting with a multiple LUN device to select and use LUNs.

FIG. 6 shows an interactive device 602 with a display screen 604 for output and buttons 606-608 for input. For example, the device 602 may include a menu driven system in which the display screen 604 shows various menus as chosen via the buttons 606-608, with each chosen menu allowing for interaction via the buttons 606-608. A touch-sensitive display screen is also an alternative for interacting with the device 602. While many menu alternatives are available, one possible device side menu that corresponds to the above table is represented in FIG. 7, which exemplifies various functions of one suitable menu system and corresponds to the data in the above-described table.

Starting with an offline LUN control menu 702, pressing the right arrow (Next) switches to a different LUN (menu 703) for interacting with its corresponding data as maintained in the table. If pressed again, the selection advances, e.g., toggling through the three available LUNs. Again starting with an offline LUN control menu 702, pressing the OK button (instead of the Next button) changes to a menu 704 that is directed to the indicated LUN for interaction therewith. This is the "Windows" LUN, (but as can be appreciated instead would be the "IP Phone" LUN if OK was pressed while "IP Phone" was indicated, as in menu 703). Pressing the Next button changes the indicator among "1. Active" "2. Visible to Host" and 3 "Rename" choices, while pressing the OK toggles the Yes/No state for Active or Visible, or enters a "Rename" menu for the current LUN choice. Rename allows entering an appropriate string of characters under the 'Friendly Name' entry, e.g., by using the left and right arrows to cycle displayed characters and the OK button to confirm each character and move to next or a "Done" indicator.

Figure 8:
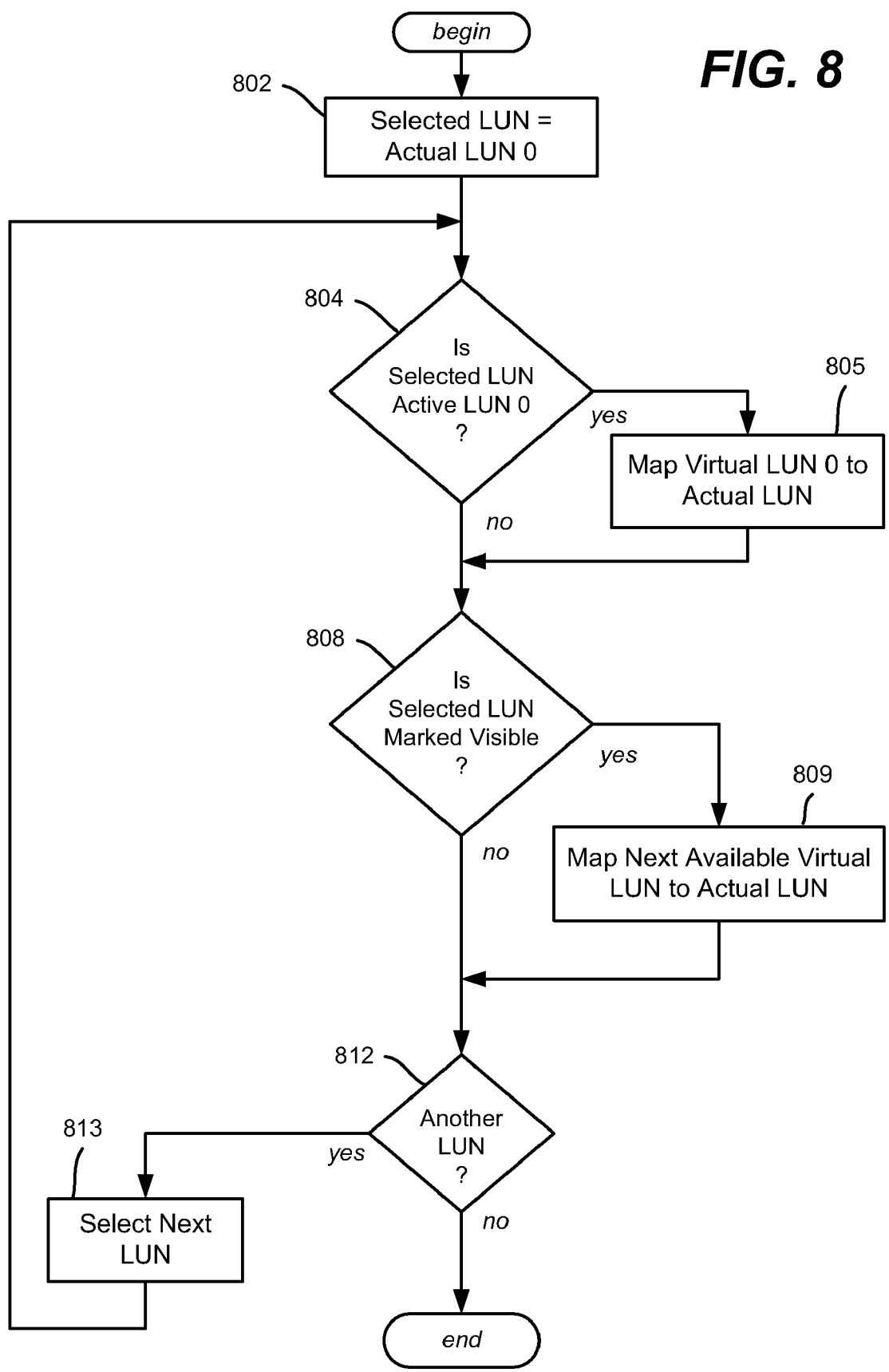
FIG. 8 is a flow diagram showing example concepts related to mapping LUNs of a multiple LUN device.

With respect to accessing the table, whether for interaction or to determine the active LUN 0 and any visible LUNs, a mapping algorithm is set forth in FIG. 8, and in general, iterates (via steps 812 and 813) through the LUNs in the control table, starting with actual LUN 0 at step 802.

If at step 804 a LUN is marked as Active LUN 0, then step 805 maps virtual LUN 0 to the actual LUN. If at step 808 a LUN is marked as visible, then step 809 maps the next available virtual LUN (if any) to the actual LUN. Note that a physical disk with multiple LUNs and multiple physical disks with independent LUNs are indistinguishable to the host. Thus, LUN0 and LUN remapping across multiple physical disks with independent LUNs is allowed.

Figure 9:
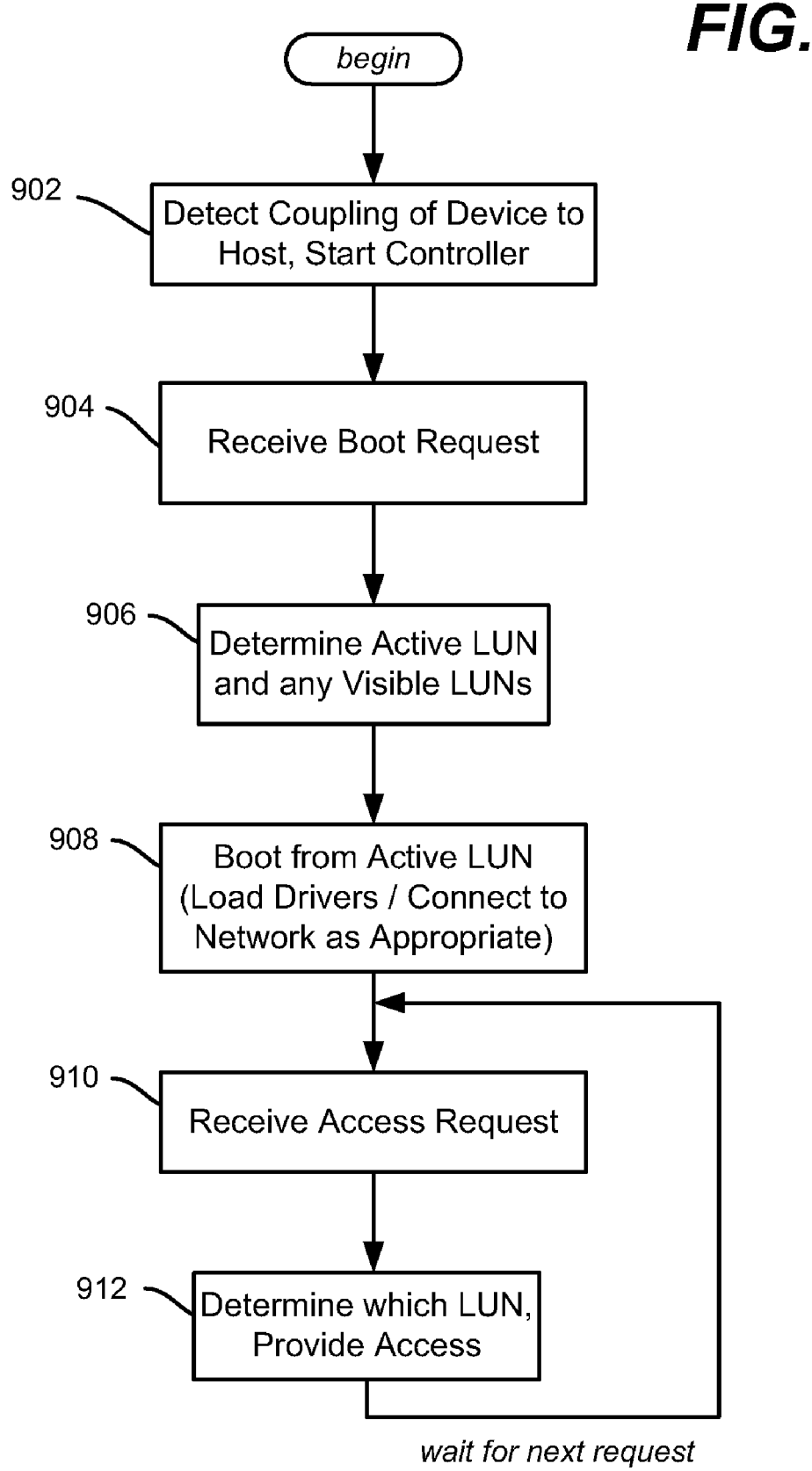
FIG. 9 is a flow diagram showing example steps that may be taken when a multiple LUN device is connected to a host computing device.

FIG. 9 depicts example steps that explain device usage when coupled to a host, beginning at step 902 where the device controller starts up in a known manner, e.g., when connection is detected through external power being provided by the host. Step 904 represents receiving a boot request from the host BIOS or firmware.

At step 906, the storage controller accesses its state table to determine which LUN is the currently active LUN and thereby corresponds to sector 0 for booting the host. The host thus boots from the currently active LUN at step 908, which may include loading network drivers and connecting to a network. Step 906 also represents determining any other visible LUNs, such as for notifying the host as to what storage can be accessed. As described above, these other visible LUNs are renumbered by the controller for viewing from the host's perspective, starting at one, so that the host is not confused by non-contiguously numbered LUNs.

Step 910 represents receiving an access request to a LUN. At step 912, the host determines which LUN/location is the actual LUN corresponding to the renumbered LUN referenced by the controller, and provides access. Further requests are similarly handled.

As can be seen, there is provided the ability to offline select which LUN within a multiple-LUN storage device (or LUNs among multiple devices) will be the active LUN 0 at host runtime, including for booting the host, along with the ability to offline select which other LUN or LUNs are visible to the host at runtime. A device-side user interface with selection and indicator facilities allow for such LUN selection. Further, friendly names may be used to identify each LUN.

Exemplary Operating Environment

Figure 10:
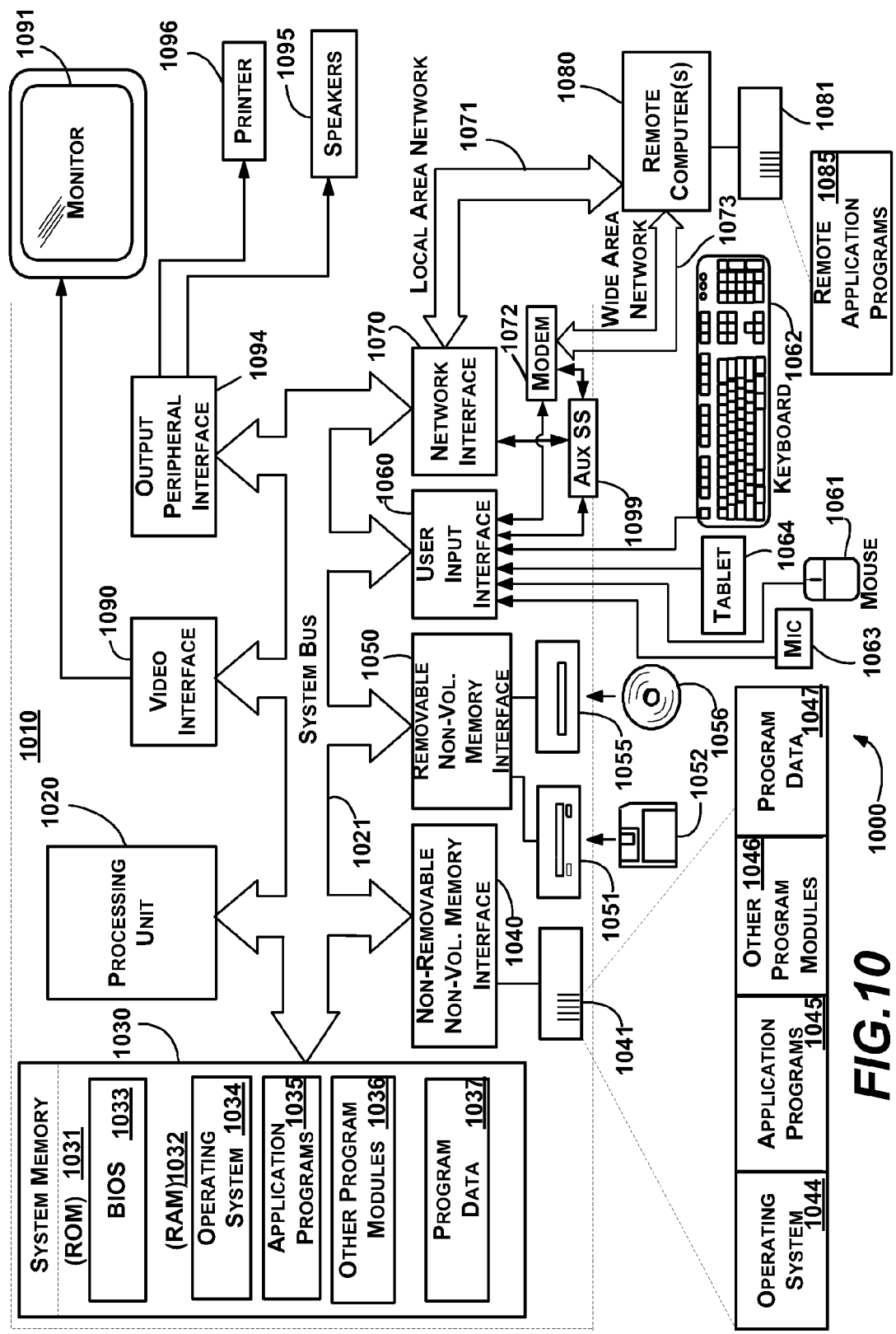
FIG. 10 shows an illustrative example of a computing environment into which various aspects of the present invention may be incorporated.

FIG. 10 illustrates an example of a suitable computing and networking environment 1000 on which the examples of FIGS. 1-9 may be implemented, such as to configure a multiple LUN device with operating systems, applications and data, or to act as a host device for the multiple LUN device. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010, e.g., as a host computer system. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising, a storage device configured with two or more logical unit numbers (LUNs) wherein at least two of the two or more LUNs are each capable of being an active LUN with respect to booting the host computing device, a logical unit number (LUN) controller configured to control access to the two or more LUNs when hosted by a host computing device, a selection mechanism coupled to the LUN controller, the selection mechanism configured to determine whether to provide access to each LUN of the two or more LUNs by the host computing device, and wherein the selection mechanism is further configured to determine which of the LUNs is currently the active LUN.

2. The system of claim 1 further comprising an indicator coupled to the storage device, the indicator configured to indicate which LUN is the currently active LUN.

3. The system of claim 2 wherein the indicator is further configured to indicate whether each LUN that is not is the currently active LUN is visible to the host computing device when coupled thereto.

4. The system of claim 1 wherein the selection mechanism is operable independent of whether the storage device is connected to another device.

5. The system of claim 4 wherein the selector mechanism includes at least one manual switch or at least one manual button, or both at least one manual switch and at least one manual button.

6. The system of claim 1 wherein the selection mechanism includes a display and means for interacting with the display.

7. The system of claim 6 wherein the display outputs interactive menus for making selections.

8. The system of claim 1 wherein wherein the controller maintains state information including whether each LUN is accessible by the host computing device and which LUN is the currently active LUN.

9. The system of claim 8 wherein the controller further maintains information that associates each LUN with a name, and wherein the name is user-modifiable.

10. The system of claim 1 wherein at least one of the at least two of the two or more LUNs is capable of booting a first host computing device, and wherein at least one other of the at least two of the two or more LUNs is capable of booting a second host computing device.

11. The system of claim 10 wherein the first host computing device comprises one of a mobile computing device, a computer, or a gaming console, and the second host computing device comprises a different one of a mobile computing device, a computer, or a gaming console from the first host computing device.

12. In a computing environment, a method comprising, determining which logical unit numbers (LUN) of two or more logical unit numbers (LUNs) is a currently active LUN, receiving a boot request, providing access to the currently active LUN for booting the host, and in response to receiving an indication that access to at least one other LUN of the two or more LUNs is permitted, providing access to the at least one other LUN.

13. The method of claim 12 wherein each LUN of the two or more LUNs is identified to the host by a different identifier relative to one another, and further comprising, determining from a host communication which LUN of the two or more LUNs on the device is being referenced by the host.

14. The method of claim 12 wherein determining which LUN of the two or more LUNs is the currently active LUN comprises accessing a data structure maintained on the device, and further comprising, detecting a change to which LUN of the two or more LUNs is the currently active LUN, and updating the data structure to correspond to the change.

15. A data storage device, comprising, a plurality of logical unit numbers (LUNs) each configured to store code or data, or both code and data, the plurality of LUNs including at least a first LUN configured to boot a first host computing device and a second LUN configured to boot a second host computing device, a controller that controls a logical connection of each the plurality of LUNs to a host computing device, and a selection mechanism configured to set which of the at least the first LUN and the second LUN is to be logically connected as a currently active LUN for use in booting a computing device when connected thereto.

16. The data storage device of claim 15 further comprising an indicator mechanism configured to indicate, independent of any connection to the host computing device, which LUN is the currently active LUN.

17. The data storage device of claim 15 wherein the selection mechanism further sets, for each other LUN of the plurality of LUNs that is not set as the currently active LUN for booting, whether the controller is to make that respective other LUN visible to the host computing device.

18. The data storage device of claim 17 further comprising an indicator mechanism configured to indicate, independent of any connection to the host computing device, which LUN of the plurality of LUNs is the currently active LUN, and whether each other LUN of the plurality of LUNs is visible to the host computing device.

19. The data storage device of claim 18 wherein the indicator mechanism comprises at least one visible switch, at least one LED, or a display screen, or any combination of at least one visible switch, at least one LED, or a display screen.

20. The data storage device of claim 15 wherein the plurality of LUNs, the controller and the selection mechanism are incorporated into a USB flash memory device.

* * * * *